United States Patent

[11] 3,555,255

[72] Inventor Wing N. Toy
Glen Ellyn, Ill.
[21] Appl. No. 751,573
[22] Filed Aug. 9, 1968
[45] Patented Jan. 12, 1971
[73] Assignee Bell Telephone Laboratories, Incorporated
Murray Hill, Berkeley Heights, N.J.
a corporation of New York

[54] ERROR DETECTION ARRANGEMENT FOR DATA PROCESSING REGISTER
13 Claims, 6 Drawing Figs.

[52] U.S. Cl. .......... 235/153, 235/92, 340/146.1
[51] Int. Cl. .......... G06f 11/08
[50] Field of Search .......... 340/146.1; 235/153, 92

[56] References Cited

UNITED STATES PATENTS 3,111,578 11/1963 Gerrand et al. .......... 235/153
3,287,546 11/1966 Geller .......... 235/153
3,342,983 9/1967 Pitkowsky et al. .......... 235/153

*Primary Examiner*—Malcolm A. Morrison
*Assistant Examiner*—Charles E. Atkinson
*Attorneys*—R. J. Guenther and Kenneth B. Hamlin

ABSTRACT: Outputs of the ordered stages of a register are applied to a first-ZERO-detecting logic and outputs of the latter are used to predict what parity state should prevail in registered information after a predetermined operation has been performed on the registered information. Illustrative predetermined operations are high speed counting and marking a low order bit of a predetermined type. The first-ZERO-detecting logic is actuated simultaneously with the initiation of the operation to be performed on the registered information and is utilized in the performance of that operation. Predicted parity is then compared with a parity indication computed after the operation has been completed to evaluate the accuracy with which the operation was carried out.

PATENTED JAN 12 1971 3,555,255
SHEET 1 OF 4
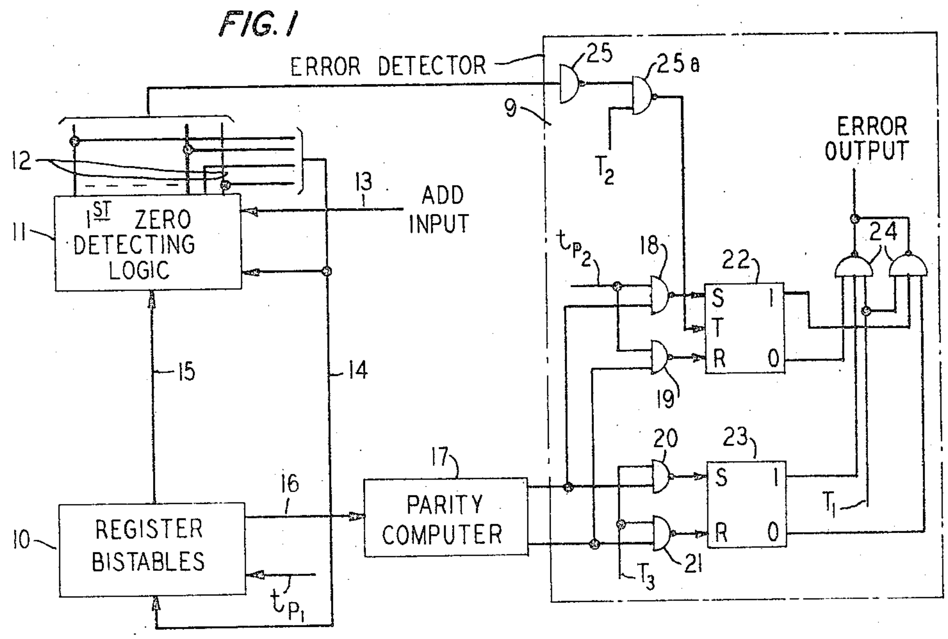
FIG. 2
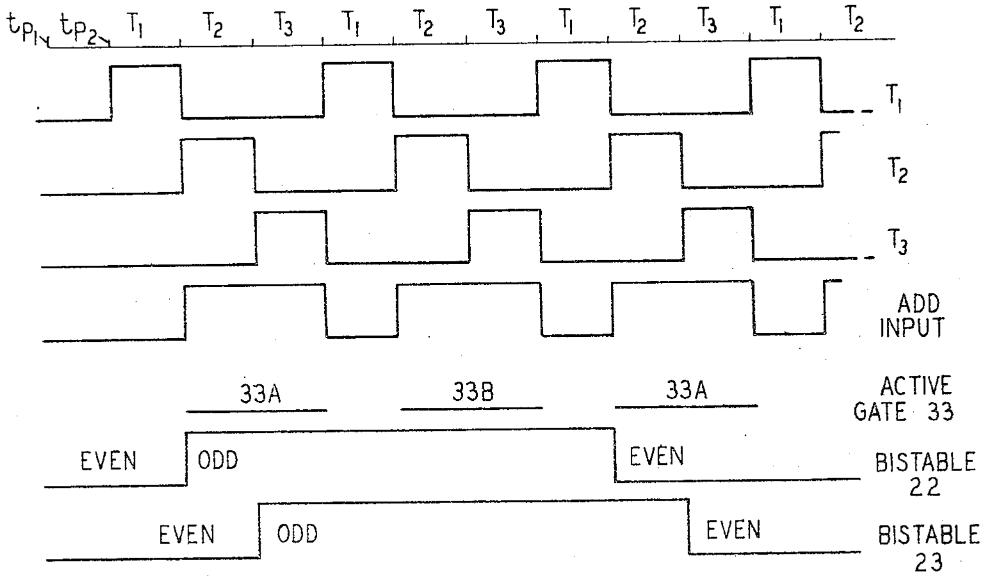
INVENTOR
W. N. TOY
BY
Charles Scott Phelan
ATTORNEY

ERROR DETECTION ARRANGEMENT FOR DATA PROCESSING REGISTER

BACKGROUND OF THE INVENTION

1. Field of the Invention

This invention relates to a high speed error detection arrangement, and it involves particularly a detection arrangement in which a predicted parity indication is compared with parity after an operation has been performed on those bits.

2. Prior Art

It is known in the counting art to predict after each counting operation what the parity of the count word should be after the next succeeding counting operation and to compare the predicted parity with a newly computed parity on the modified counter word after such next succeeding operation. This type of operation indicates conveniently the accuracy of the counting operation. However, separate, extra, time intervals, beyond the actual counting interval, are required for each of the predicted and new parity computations. In data processing systems the use of extra time intervals for any type of operation should be avoided since the total additional time required for frequently employed operations accumulates rapidly and soon becomes quite significant. For example, the extra time accumulates rapidly in the operation of an instruction counter which must be incremented or decremented frequently to keep track of program instructions. Also, in associative or scanning operations the need to mark an information bit of a certain type occurs frequently and should be subjected to error detection.

It is, therefore, one object of the invention to perform error detecting functions on a register rapidly.

It is another object to utilize logic for error detection which also performs other information processing functions.

A further object is to compute predicted parity for a predetermined data processing operation at the same time that such operation is being carried forward.

Still another object is to perform an error detecting operation by comparing parity computations based on dissimilar states of signal indications.

STATEMENT OF THE INVENTION

The aforementioned and other objects of the invention are attained in an illustrative embodiment in which an error detecting circuit is connected to be responsive to transitory signals produced by a signal processing operation for information-representative signals in the register to indicate what the nature of a characteristic of those signals should be upon completion of the operation. Such characteristic is then separately determined from stable information-representative signals after the operation has been completed, and the two indications of the characteristic are compared to indicate the accuracy with which the operation has been carried out.

It is one feature of the invention that odd-even parity is utilized as the significant characteristic of information-representative signals for error detecting operations on a counter.

It is another feature that the information-representative signals appear in a register; and first-ZERO-detecting logic, which is responsive to the nature of those signals, is operable to provide the transitory signals for predicting parity and is also utilized for achieving data processing operations to be performed on the contents of the register.

It is a further feature that different forms of circuit connections for the first-ZERO-detecting logic are available for realizing different compromises between circuit flexibility and the scope of circuit faults which produce detectable errors.

DESCRIPTION OF THE DRAWING

The aforementioned features and objects of the invention and various advantages thereof may be more readily understood from a consideration of the following detailed description and the appended claims in conjunction with the attached drawing in which:

FIG. 1 is a block and line diagram of an application of error detecting circuits of the present invention to a high speed counter;

FIG. 2 is an illustrative timing diagram demonstrating the operation of the circuits of FIG. 1;

DETAILED DESCRIPTION

FIG. 1 illustrates the error detecting arrangement as applied to a high speed counting circuit of the type disclosed in my copending application Ser. No. 674,834, which was filed on Oct. 12, 1967. An error detector 9 cooperates with a counting arrangement including a register 10 that comprises a series of bistable circuits which are interconnected through first-ZERO-detecting logic 11 for binary counting operation.

Figure 3:
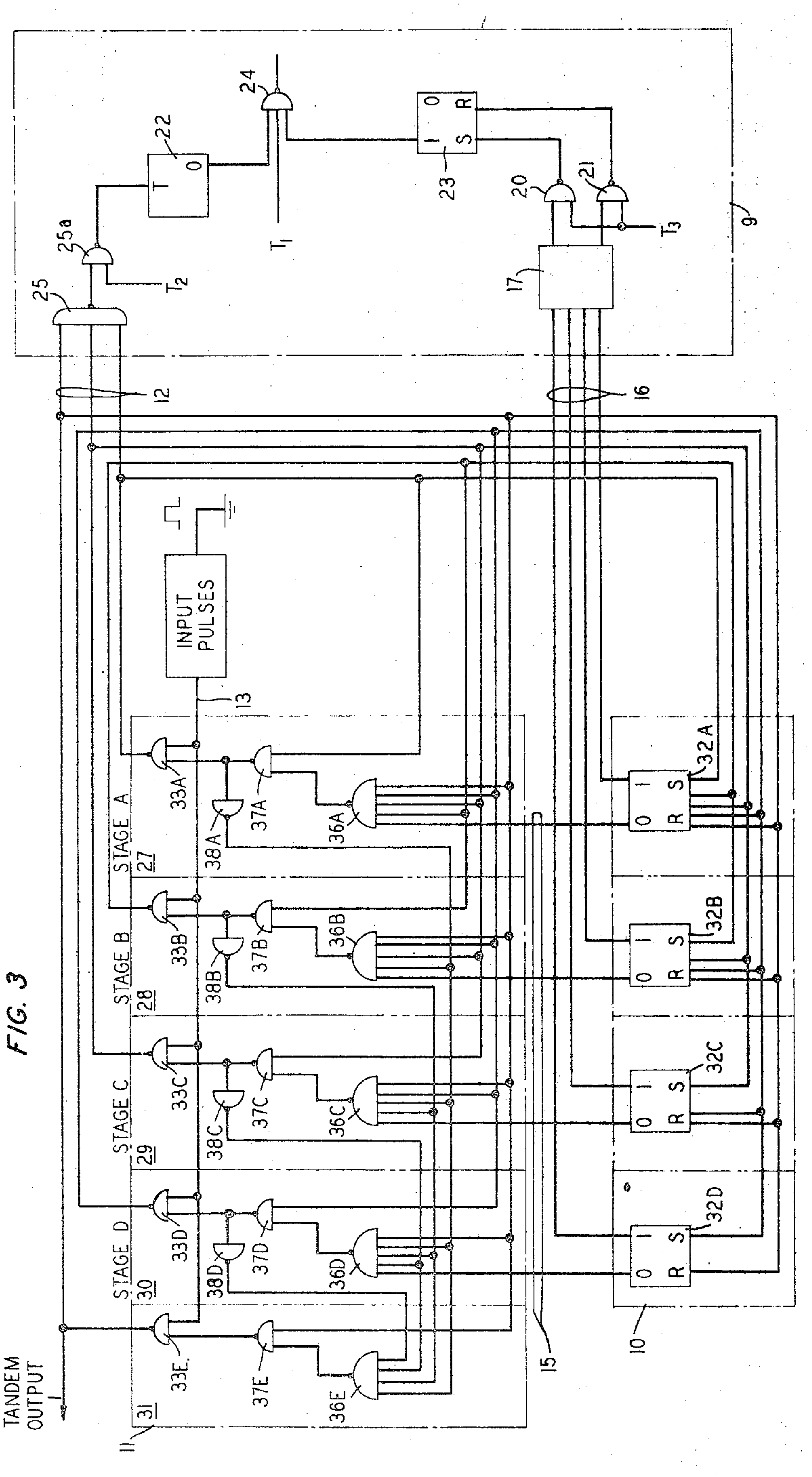
FIG. 3 is a simplified schematic diagram presenting details of the embodiment of FIG. 1.

Details of the overall counter are found in my aforementioned application but will be shown and described to a limited extent in this application in connection with FIG. 3. However, briefly in regard to FIG. 1 and the counting operation, the first-ZERO-detecting logic 11 includes a plurality of output connections 12 which are normally at a positive potential in the absence of an ADD input signal on an input connection 13. The logic 11 includes different stages of similar circuits corresponding and operatively associated with the various bistable circuits in the register 10 which represent the stages of the counting arrangement. Each input pulse on the circuit 13 causes one only of the output leads 12 to be activated to the ground potential state, and that one lead is the one which is associated with the register stage containing the lowest order binary ZERO in the counting information represented by the various stable states of the register stages. The single activated output lead 12 represents only a transitory signal state which is coupled back through a corresponding lead in a cable 14 to the register 10. In that register the signal on the activated lead sets the register stage corresponding to the stage of the activated lead and resets all lower order stages of the register. The same single activated signal lead is also extended to other input connections of the first-ZERO-detecting logic 11 in conjunction with output signals from the register 10 to enable the logic 11 to maintain its activated signal when the output signals from the register 10 are changed to a new state and to disable all higher order stages of logic 11. The single activated output of logic 11 is said to be transitory because it persists until enabling inputs to logic 11 are removed. Such enabling input is the ADD input in FIG. 1, but in another embodiment to be described it is the inputs from register 10.

Operation of the circuit of FIG. 1 is initiated by establishing a desired initial information-representative state in the bistable circuits of register 10. This is accomplished by circuits schematically represented by an input at a time $t_{pl}$ which is also indicated in the timing diagrams of FIG. 2. The $t_{pl}$ input may be simply a resetting input signal to all stages of register 10, or it may be input gating for establishing any predetermined initial information state in the register. In either case, it is advantageously provided from a central control, not shown, in a program controlled data processing system.

The stable output signal conditions from register 10 are applied through connections in a cable 15 to operate the first ZERO detecting logic 11 as previously noted, and they are also applied through connections in a cable 16 to a parity computer 17 which determines a suitable error detecting code for the information stored in register 10. The parity computer 17 in the embodiment of FIG. 1 is advantageously a circuit for determining odd-even parity over the information in register 10, and no details of this circuit are shown since they are well known in the art and comprise no part of the present invention. The output of parity computer 17 appears in double rail logic form to indicate whether the information in register 10 is characterized by odd or even parity. These signals are applied to four coincidence gates 18, 19, 20, and 21 to operate two bistable circuits 22 and 23.

The gates 18—21 are conventional NAND logic gates which respond to a coincidence of positive signals on all input connections thereof for producing a ground signal at the output connection. These NAND circuits similarly produce a positive output signal if a ground signal is applied to any one of their input connections. Similar gates are employed throughout the drawings in the present application and also are included in crosscoupled pairs for operation in the bistable circuits, such as the circuits 22 and 23, in a manner well known in the art. Thus, for example, the application of a ground signal to a set input S of a bistable circuit of this type causes it to produce a positive signal on the corresponding binary ONE output of the bistable circuit and a ground signal on the binary ZERO output of the circuit. In addition, the bistable circuit 22 in FIG. 1 includes a toggle input connection T which responds to a ground input signal for causing the bistable circuit to be transferred from either one of its stable conditions to the other.

After the initial signal $t_{p1}$, another initial condition signal $t_{p2}$ enables gates 18 and 19 to respond to the outputs from the parity computer 17 for actuating either the set or the reset input of the bistable circuit 22 to establish the latter circuit in one or the other of its two stable conditions corresponding to the initial parity condition of information in register 10. Signal $t_{p2}$ is also supplied by a program controlled arrangement, not shown, and follows the signal $t_{p1}$ when the overall circuit of FIG. 1 is being set up for operation.

The operation of the present error detecting arrangement in conjunction with a high speed counter embraces three cyclically repeated time intervals designated T1, T2, and T3 in FIG. 2. The latter figure comprises a family of time diagrams drawn to a common time scale to illustrate the operation of the error detecting arrangement in FIG. 1. Initially, ADD input pulses are withheld until after the occurrence of times $t_{p1}$ and $t_{p2}$ so that an initial information state can be established in register 10 and its parity computed and stored in the bistable circuit 22. ADD input signals are still further withheld until after the first occurrence of time T3 and subsequent time T1 to permit the same initial parity indication to be established in the bistable circuit 23 during time T3. During the subsequent time T1 the conditions of the bistable circuits 22 and 23 are compared by two further NAND gates 24 that are enabled to respond to the outputs of those two bistable circuits. Each gate 24 receives the binary ZERO output of a different one of the two bistable circuits and the binary ONE output of the other. Accordingly, one gate 24 is actuated during any time interval T1 when the two bistable circuits are in different stable conditions. Such different conditions indicate that an error has occurred, and this condition is indicated by the resulting ground output from a gate 24.

Assuming that initial conditions have been properly established without error in the arrangement illustrated in FIG. 1, counting actually begins with the application of an ADD input pulse during successive time intervals T2 and T3. This input pulse actuates one of the first-ZERO-detecting logic output connections 12, as previously described. Odd-numbered ones of these output connections in the sequence of increasing orders of binary significance are combined in a NAND circuit 25 to inputs of an associated NAND circuit **25*a* for actuating the latter circuit during any time interval T2 when an odd-numbered one of the output circuits 12 is activated to its ground condition. The circuit 25** responds to any ground input signal to produce a positive output signal.

The actuation of NAND gate **25*a* causes a ground output signal to be applied to the toggle input connection T of bistable circuit 22 for complementing the state of that circuit. However, if no odd-numbered output lead 12 from the logic circuit 11 is activated by the ADD input signal, circuit 25 continues to produce a ground output which disables the NAND gate 25*a*; and no change is produced in the state of bistable circuit 22**.

It will be recalled from conventional binary counting sequences that, if the low order ZERO of a binary number is in an even-numbered position in the sequence of increasing orders of binary significance, the odd-even parity of the binary coded information is unchanged by adding one to the binary coded information. In this situation the low order ZERO is changed to a binary ONE while an odd number of other digits are changed to the binary ZERO condition. Thus, the total number of digits which change state is an even number, and no change is required in the odd-even parity representation. However, if the low order ZERO had been in an odd-numbered digit position, the parity indication would change because that ZERO changes to a binary ONE at the same time that an even number of other stages are changing from the binary ONE to the binary ZERO state. Thus, in the embodiment of FIG. 1, while the first-ZERO-detecting logic 11 and the bistable circuits of register 10 are changing during time interval T2 to reflect the new information condition represented by an ADD input pulse on circuit 13, the error detector 9 is simultaneously operating to determine whether or not a new parity state should prevail in the modified information in register 10. If a new state is to prevail, it is established in the bistable circuit 22 as required, but still during the time interval T2.

During time interval T3, and after the bistable circuits of register 10 have settled into their new stable states, the parity computer 17 computes the parity over the new information in register 10. Outputs from parity computer 17 are coupled through gates 20 and 21 to establish any new parity condition in the bistable circuit 23. Thereafter during time interval T1 gates 24 are again enabled to compare the new parity state represented in bistable circuit 23 with the previously predicted parity state represented by the condition of bistable circuit 22 and to indicate an error if the two parity indications are different.

The timing diagrams in FIG. 2 show the described operation of FIG. 1 for a sequence in which three successive adding input pulses are applied to the first-ZERO-detecting logic 11 under assumed conditions of initial binary ZEROs in all stages of the register 10, and for conditions under which no errors occur.

FIG. 3 includes greater detail of the counting arrangement of my aforementioned application in order to indicate operation in conjunction with specific illustrative types of counting errors. Reference characters employed in FIG. 1 for the counter are the same as those employed in the corresponding FIG. of my aforementioned application. The outputs of the odd-numbered stages of logic 11 are applied from gates 33A, 33C, and 33E through NAND gate 25 to the input of NAND gate **25*a* as in FIG. 1. The binary ONE outputs of the register bistable circuits 32A through 32D are applied to inputs of parity computer 17. Full details of the error detector 9 are not illustrated in FIG. 3 since they are the same as those shown in FIG. 1** and need not be repeated for the present consideration of various types of counting errors.

Briefly amplifying the description of the operation of the counter in connection with details in FIG. 3, the information representative states of the different bistable register stages in the register 10 cause corresponding binary ZERO output signals to be provided to corresponding gates 36 in first-ZERO-detecting logic 11. A ground ZERO output from a set bistable circuit in register 10 disables the corresponding gate 36; and the output of that gate ultimately cooperates with the output of the corresponding gate 33 of the same stage, after termination of its transistory signal, to actuate the gate 37 in the same stage. A ground output from the actuated gate 37 disables the gates 33 and 38 of the same stage.

On the other hand, a positive ZERO output from a reset bistable circuit in register 10 enables the gate 36 of the corresponding counter stage, and that gate is ultimately actuated through the cooperation of such output and the stable positive outputs of gates 33 in stages of higher order. The resulting ground output from the gate 36 disables the corresponding gate 37, and the latter gate produces a positive output which enables the corresponding gate 33 and actuates the corresponding gate 38. A ground output from the latter gate disables all gates 36 in stages of higher order so that their respective gates 33 are disabled in the manner just described.

Thus, a single gate 33 in the overall counting arrangement is enabled to respond to an adding input pulse on circuit 13. This single enabled gate is in the counter stage which represents the lowest order binary ZERO in the information content in register 10. Hence, the name "first-ZERO-detecting logic" for the circuit 11. The application of an ADD input pulse to this single enabled gate 33, and its resulting ground output signal, sets the bistable circuit 32 of the same counter stage and resets bistable circuits 32 of any lower order stages in register 10. Successive ADD input pulses on circuit 13 cause the information representative states of bistable circuits 32 to be altered in a binary counting fashion.

In FIG. 3, counting errors which affect the operation of bistable circuits 32 without affecting the operation of corresponding gates 33 immediately on the application of an ADD input pulse are detected and indicated when such input pulse is applied. Thus, the new parity state is predicted by the error detector 9 in response to the transitory output signals of gates 33, as previously described. If a fault condition prevails in an input connection to a bistable circuit 32 which must be activated for the particular current counting operation, an error results in the new count which is produced in the register 10. Consequently, at time T1 following the new adding input pulse bistable circuits 22 and 23 are in different stable states and one of the gates 24 is actuated to produce a ground output error indication.

A great variety of single and multiple fault conditions are possible in the illustrative circuit of FIG. 3. However, for purposes of illustration, single fault conditions will be described, and the effects of others can readily be determined in similar fashion. If the register 10 contains the binary number 0011 a new input pulse on circuit 13 activates gate 33C to set bistable circuit 32C and reset bistable circuits 32A and 32B. The same output from gate 33C also activates gate 25*a* in error detector 9 to complement the state of bistable circuit 22 since the stage C is an odd-numbered stage. If a fault were present at the time of these operations just described and in the form of an open circuit in the reset input to bistable circuit 32B from gate 33C, that bistable circuit will not reset as it should. Accordingly, the new count state produced in register 10 is 0110 instead of 0100. Thus, both the initial state and the erroneous new state of information representative signals in register 10 are characterized by an even parity condition, and no change takes place during time T3 in the state of bistable circuit 23. However, since bistable circuit 22 had represented the even parity state just prior to the new input pulse on circuit 13, and had been toggled to represent the odd parity state during such input pulse, the bistable circuits 22 and 23 now reside in different stable states to indicate that an error has occurred.

Assume for a different case a fault in FIG. 3 which permanently disables a gate 33. That gate must then continuously produce a positive output signal whether or not it receives appropriate enabling input signals to cause it to change its output indication. This type of fault prevents operation of the counter into the state in which the faulty gate can be actuated to produce the transitory ground output signal. Consequently, when adding input pulse is applied for that particular operation, no change takes place in the counter state or in the conditions of the bistable circuits 22 and 23, so no error is indicated even though an attempt had been made to advance the counter at a time when a fault was present in a relevant stage of the counter. A modified form of the error detector 9 is illustrated in FIG. 4 for use in connection with the counter of FIG. 3 to detect errors resulting from a larger scope of faults and including the case just described.

Figure 4:
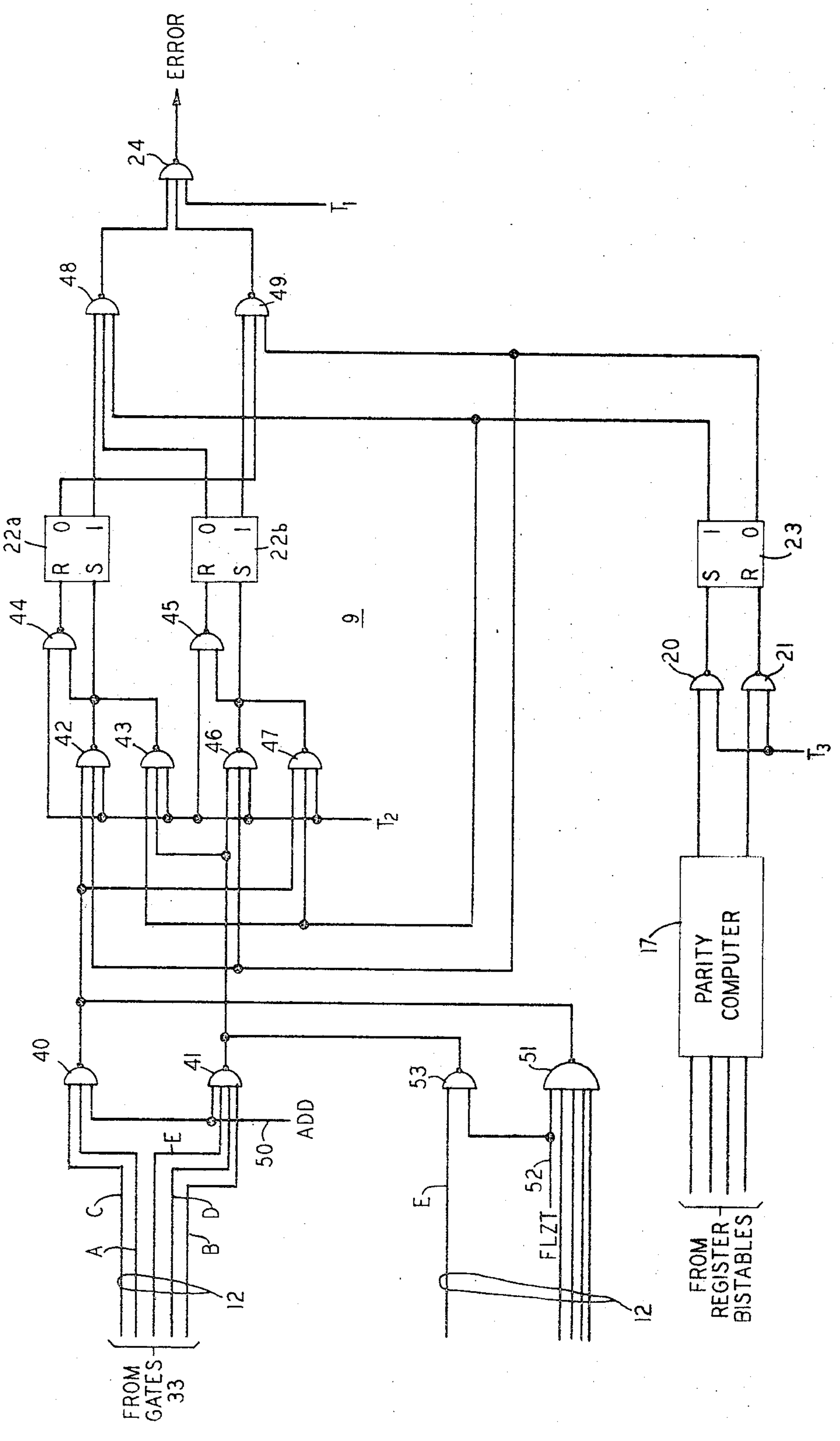
FIGS. 4 and 5 are simplified partial schematic diagrams of modified forms of the embodiment of FIG. 3.

The circuit in FIG. 4 is a modified form of the error detector 9 which is useful to detect errors resulting from the type of faults which permanently disable one of the counter gates 33. In FIG. 4 all of the first ZERO detector output leads 12 are carried to the error detector 9 instead of taking only the odd-numbered leads as was the case in FIG. 3. The leads 12, divided into two groups, are applied to input connections of two NAND gates 40 and 41, respectively. The bistable circuit 23 receives the parity computer outputs from NAND gates 20 and 21 in the same fashion as in FIG. 3. Timing interval signals T1, T2, and T3 are also utilized as before.

In order to facilitate association of the circuit of FIG. 4 with the circuits in FIG. 3, the leads 12 in FIG. 4 are further individually designated with the letter of the counter stage from which they extend. The leads 12 which are further designated A and C in FIG. 4 extend from gates 33A and 33C in odd-numbered stages of logic 11 to gate 40 in FIG. 4. Gate 40 is disabled and produces a positive output signal whenever the signal on either of the leads A or C is at ground to indicate that an adding input pulse should effect a change of state in an odd number of stages of the counter. Similarly, leads B and D of FIG. 4 are applied to inputs of gate 41 to cause that gate to produce a positive output signal whenever an even number of stages of the counter are to change state. Finally, the lead E in FIG. 4 extends from the stage E of logic 11 in FIG. 3 and indicates, when a ground appears thereon, that all four of the stages A through D of the counter are in the binary ONE state and the currently applied ADD input pulse will reset them to the binary ZERO state. This is the full count condition for the circuit and involves an even number of stage changes for the particular embodiment illustrated in FIG. 3. Clearly, however, the input lead E must be applied to either the odd gate 40 or the even gate 41, depending upon whether there are an odd or an even number of stages in the counter register 10.

Four further NAND gates 42, 43, 46, and 47 control the stable states of two bistable circuits 22*a* and 22*b* in FIG. 4. Those gates compare the old, or preadd, parity state of bistable circuit 23 and the indication from gates 40 and 41 of whether an odd or an even number of counter stages are to be changed by the new adding operation. Thus, the gates 42, 43, 46, and 47 predict what the new, or postadd, parity state should be. Two further NAND gates 44 and 45 respond during time interval T2 for converting the outputs of gate pairs 42, 43 and 46, 47, respectively, to double rail logic form for exercising full overwrite control of bistable circuits 22*a* and 22*b*. If the current preadd parity state is odd (positive ZERO output from 23) and an odd number of counter stages are to be changed (positive from gate 40), or if the preadd parity is even (positive ONE from bistable 23) and an even number of counter stages are to be changed (positive from gate 41), the postadd parity should be even; bistable circuit 22*a* is set by gates 42 or 43, respectively, and bistable circuit 22*b* is reset by gate 45. Similarly, if the preadd parity is odd and an even number of counter stages are to be changed, or if the preadd parity is even and an odd number of counter stages are to be changed, the postadd parity should be odd; the ground output from one of the gates 46 or 47, respectively, causes bistable circuit 22*b* to be set, and the ground output from the gate 44 causes bistable circuit 22*a* to be reset.

Two further NAND gates 48 and 49 relate the outputs of bistable circuits 22*a*, 22*b*, and 23 to indicate whether or not an error has occurred. Thus, if an error has occurred, both of the gates 48 and 49 must be disabled by at least one ground input signal to each so that both produce positive output signals for enabling the gate 24 to be actuated during interval T1 to indicate that an error has occurred. In this embodiment only a simple gate 24 is required. If operation is proper with no errors, i.e., predicted and final parity agree, at least one of the gates 48 and 49 must be fully actuated by outputs from the three bistable circuits to produce a ground disabling signal to NAND gate 24. Thus in the error detector of FIG. 4, instead of looking to certain active stages of the counter and immediately predicting whether or not a parity change should occur, the gates of FIG. 4 first determine whether an odd or an even number of counter stages is to change state, and then that determination is compared with the preadd parity indication in bistable circuit 23 to predict what the postadd parity should be. This new indication is registered in the bistable circuits 22*a* and 22*b*. Subsequently, after the new postadd parity has been established in bistable circuit 23 in the manner described in connection with FIGS. 1 and 3, such parity is compared with the predicted parity to determine whether or not the error-indicating gate 24 should be actuated. In each case, whether the predicted parity is odd or even, one of the bistable circuits 22*a* and 22*b* is in the set state and the other in the reset state as established during timing interval T2. The resulting positive ZERO output signal from one of the two bistable circuits is combined with the positive ONE output signal of the other one of the two bistable circuits and with a positive output signal from bistable circuit 23 to actuate one of the gates 48 and 49 for disabling gate 24.

It will be understood from the description of the operation of error detector 9 in FIG. 4, in conjunction with an adding operation, that it is capable of detecting errors resulting from a larger scope of circuit faults than is the error detector arrangement in FIGS. 1 and 3. Thus, if during any counter operation the signals on leads 12 all remain positive with no transitory ground signal, it is concluded that the gate 33 of the counter stage containing the low order ZERO is disabled by some circuit fault. In this situation both of the gates 40 and 41 in FIG. 4 are active since all of their input signals are positive. Accordingly, their ground output signals disable all of the gates 42, 43, 46, and 47 so that the resulting positive output signals from the latter gates enable both of the gates 44 and 45 thereby resetting the bistable circuits 22*a* and 22*b*. The ground ONE output signals from these two bistable circuits disable both of the gates 48 and 49 regardless of the state of bistable circuit 23 and cause gate 24 to be activated during time interval T1 to indicate that an error has occurred. Thus, the circuit fault which could not be detected by error detector 9 in FIGS. 1 and 3 is readily detectable by the arrangement in FIG. 4.

Similarly, for FIG. 4 if the circuit fault is in an input connection to a bistable circuit in register 10 as first described in connection with FIG. 3, the resulting error in the count state is indicated in error detector 9 of FIG. 4 by the incorrect state of bistable circuit 23 at time interval T3, so that gates 48 and 49 determine that an error indication should be given. The circuit of FIG. 4 detects many of this type of errors which involve counting operations wherein a proper transitory signal is produced by a gate 33, but register 10 does not respond correctly. The circuit of FIG. 4 is thus capable of detecting errors resulting from circuit faults in most of the counter and error detector circuits. The final error gate 24 is not checked by the circuitry shown, and a periodically occurring maintenance routine must be used to check that aspect. For this purpose the maintenance routine would change the state of bistable circuit 23 without changing the state of the counter and determine whether or not error indicating gate 24 was thereby actuated.

An in any error detecting arrangement, there are certain types of errors which can be detected and others which cannot. One type of error which can be detected by the circuit of FIG. 4, and which has not yet been discussed is that which results from an open circuit fault in the input to gate 36B of FIG. 3 from gate 38A when the counter is at the binary count condition 1000. In this condition gate 38A should inhibit the operation of higher order stages in logic circuit 11, but the mentioned fault prevents such inhibiting signal from affecting stage B. Thus, upon the occurrence of the next ADD input pulse on circuit 13 both of the gates 33A and 33B respond to produce ground output signals. These transitory outputs disable both of the gates 40 and 41 which provide enabling outputs to all of the gates 42, 43, 46, and 47. Consequently both of the bistable circuits 22*a* and 22*b* are set regardless of the state of bistable circuit 23. The ground ZERO outputs from bistable circuits 22*a* and 22*b* disable gates 48 and 49 so that gate 24 is actuated during time interval T1 to indicate an error.

The transistory ground outputs from gates 33A and 33B in the case just described attempt to set and reset bistable circuit 32*a* at the same time. Thus, either one of two count conditions, 1010 or 1011, may occur, depending upon the outcome of the race with respect to bistable circuit 32*a*, but both count conditions are erroneous. As previously mentioned, the mere fact that two transitory ground signals were produced from the gates 33 is enough to produce an error indication in the circuits of FIG. 4 regardless of the output of the race with respect to bistable circuit 32*a*.

A more difficult error, and one which cannot be detected by the circuit of FIG. 4, is that in which an open circuit fault occurs in the input to gate 36C from gate 38A at the count 1010. In this situation another race occurs with respect to bistable circuit 32*a* because both of the gates 33A and 33C produce transitory ground output signals on the succeeding ADD input pulse on circuit 13. In this case the counting results may be either 1100 or 1101, both of which are erroneous; but only the 1100 error can be detected by the circuit of FIG. 4. The 33A and 33C outputs are applied to the same gate 40 in FIG. 4; and, since both tend to disable the gate, the bistable circuits 22*a* and 22*b* are controlled as though proper operation were taking place for a case in which an odd number of counter stages are to be changed. Since the preadd parity was even for the 1010 count, the circuits of FIG. 4 predict a postadd parity that is odd. Thus, if the aforementioned race produces the postadd count of 1101, which has odd parity, no error is detected; but if the race produces the postadd count of 1100, which has even parity, then an error is indicated. The undetected 1101 error just described can nevertheless be detected by modifying the counter circuit in the manner illustrated in FIG. 5.

Figure 5:
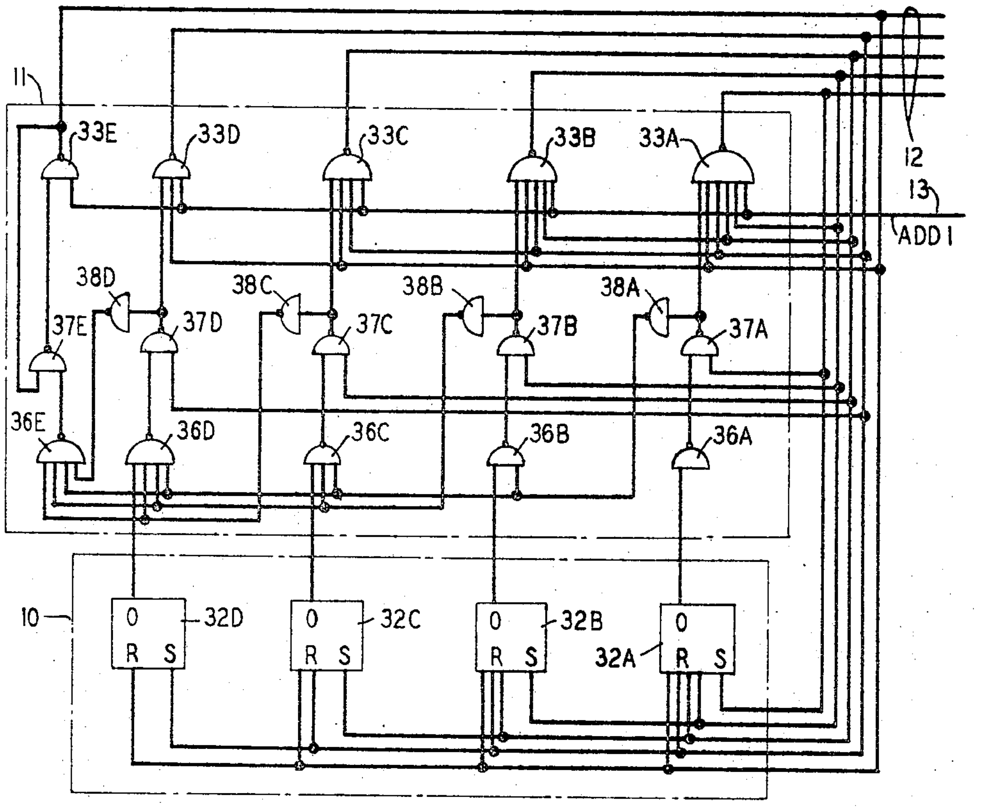

In FIG. 5 the register 10 and logic 11 of the high speed binary counter are illustrated in modified form with reference characters corresponding to those employed in FIG. 3. Error detecting circuitry associated with the counter in FIG. 5 is not shown but is preferably of the type illustrated in FIG. 4. However, the error detector 9 of FIG. 1 can also be employed with the counter of FIG. 5. The essential difference between the counter circuits of FIGS. 3 and 5 is that in the first-ZERO-detecting logic 11 the output connections from gates 33A through 33E to inputs of gates 36 in FIG. 3 have been shifted to inputs on corresponding gates 33 in FIG. 5. Thus, in the latter FIG. the output from each gate 33 in logic 11 is coupled to an input of all gates 36 in FIG. 3 have been shifted to inputs on corresponding gates 33 in FIG. 5. Thus, in the latter FIG. the output from each gate 33 in logic 11 is coupled to an input of all gates 33 of lower order in the binary counter, as well as being coupled to gates 37 and bistable circuits 32 in the manner previously illustrated in connection with FIG. 3. Thus, the activation of any one of the gates 33 by an ADD input pulse on circuit 13 in FIG. 5 produces a ground output signal from such gate which disables all gates 33 in stages of lower order.

When an open circuit fault occurs in FIG. 5 in an input connection to gate 36C from the gate 38A, while the counter is standing in the count condition 1010, the resulting errors can be detected regardless of the outcome of a race condition in register 10. The new ADD input pulse initially activates gates 33A and 33C, but almost immediately after the start of time interval T2 the output from gate 33C inhibits gate 33A. During the brief interval at the beginning of T2 when both 33A and 33C are activated, the bistable circuit 32A is simultaneously set and reset. After gate 33A has been inhibited, however, the set signal is removed and the bistable circuit settles to the reset, or ZERO, state. Error detector 9 ultimately sees only the transitory ground output from gate 33C which indicates that an odd number of stages of the counter should change state. Accordingly, the error detector 9 predicts, from the even parity state in bistable circuit 23 for the old word 1010, that the new parity state should be odd and causes bistable circuit 22*a* to be set.

In register 10 the transitory ground output from gate 33C sets bistable circuit 32C and resets bistable circuits 32A and 32B. Thus, the new, erroneous, count state is 1100; and it has the same even parity as the initial count state 1010 so the state of bistable circuit 23 remains unchanged to indicate even parity for the new count condition. The ground ZERO output of bistable circuit 23 disables gate 49 and the ground ONE output of bistable circuit 22*a*, now resting in its reset state, disables gate 48. Accordingly, positive outputs of gates 48 and 49 enable gate 24 to be actuated during time interval T1 to indicate that an error has occurred.

A review of the embodiments described up to this point indicates that for any embodiment errors resulting from certain types of faults are detectable and others are not. This is, of course, true of all error detecting circuits; and the circuit designer must determine for each particular application the best compromise among hardware costs of different techniques available, proportion of errors to be detected, and the amount of time available to accomplish the desired detection. The present invention constitutes a detection tool that is useful for fast detection and is useful to reduce the time lag in the detection of a sizeable group of possible errors. Such time lag reduction permits both conservation of processing system operating time, and it permits fault correction and program resumption with minimum instruction overlap.

The embodiments of the invention which have been described so far all involve primarily counting operations, i.e., incrementing or decrementing binary coded information. However, the underlying error detection principles are also useful in other connections in which a digit representation of a particular type has some unique significance. For example, the first-ZERO-detecting logic 11 is of the type which can be readily modified by those skilled in the art for detecting the low order binary ONE which would be useful in a counter for decrementing a binary word as is often done in index registers, for example, of data processing systems. The same type of logic is also useful in data processing operations which involve simply detecting and changing a bit of a particular type of significance without changing other bits in a group. Operation of the latter type is useful, for example, in scanning operations, or in associative operations, wherein a single bit of a data word represents some desired form of status information. When a bit of a certain type is detected, the processing system is informed that the entire word or some apparatus having an address corresponding to the bit position address of the detected bit should be processed in a predetermined fashion.

The operation of finding and marking a low order ZERO is a find low ZERO test (FLZT); and since only a single bit of the relevant information word is to be changed, the logic 11 advantageously works between two different registers as will be discussed in regard to FIG. 6. However, the nature of the FLZT operation is such that if any ZERO is found only one bit is changed at a time and necessarily complements the parity state regardless of the odd or oven bit position of the bit changed. In recognition of this fact the input connections to error detector 9 in FIG. 4 are altered to permit instruction-controlled selection of appropriate input logic for either counting or FLZT operation.

In FIG. 4 additional inputs to gates 40 and 41 are provided from a circuit 50 which supplies the positive instruction-controlled ADD signal during counting operations and ground at other times. A further NAND gate 51 is connected to receive leads 12 from gates 33A—33D, and a gate 53 is connected to receive a corresponding lead from gate 33E. An instruction-controlled lead 52 provides a positive enabling FLZT signal to gates 51 and 53 at times when first-ZERO-detecting logic 11 is to be employed for finding and marking a low ZERO rather than for a counting type of operation. The outputs from gates 51 and 53 are connected to the outputs from odd gate 40 and even gate 41, respectively, so that they also affect NAND gates 42 through 47 in conjunction with the bistable circuit 23 for determining stable states of bistable circuits 22*a* and 22*b*. If logic 11 indicates a ZERO in any stage during an FLZT operation, gate 51 is disabled and enables gates 42 and 47. If no ZERO is indicated a ground on lead E disables gate 53 and thereby enables gates 43 and 46.

Figure 6:
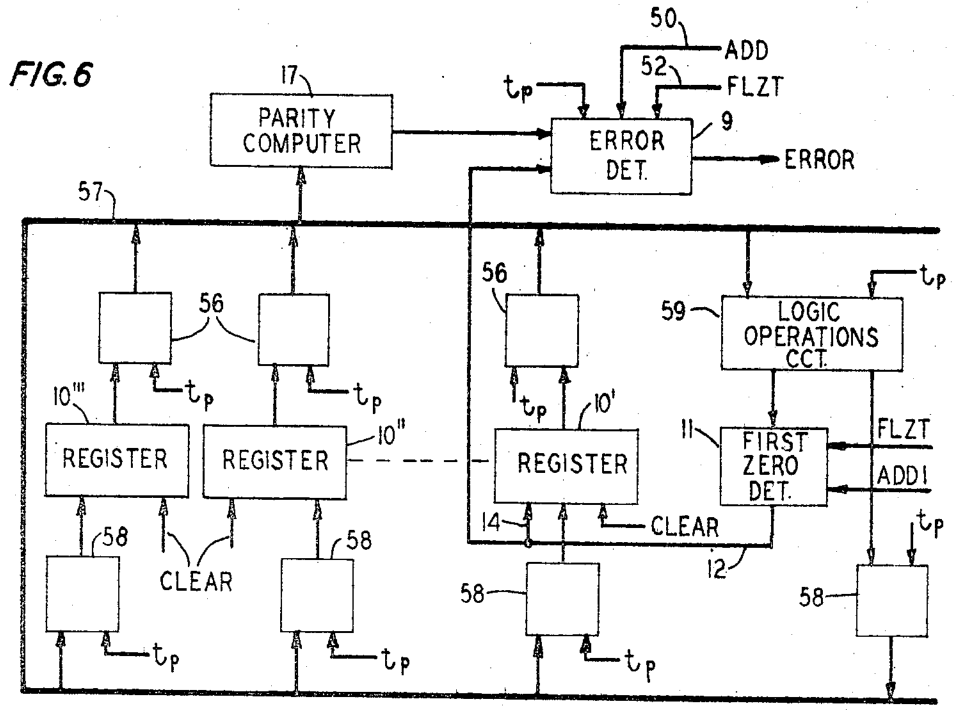
FIG. 6 is a simplified block and line diagram of the error detecting arrangement of the invention used in a data processing system.

FIG. 6 illustrates the application of the error detection principles hereinbefore discussed to a data processing environment. The data processing arrangement is illustrated in vastly simplified form since most of the details comprise no part of the present invention. Plural registers 10′, 10″, and 10‴ are utilized as accumulation registers in a manner which is now known in the art. These registers are time gated by output gates 56 to couple their contents in bit-parallel single-rail-logic fashion to a multicircuit gating bus 57, and they are also time gated by means of input gates 58 to receive information in bit-parallel, single-rail-logic fashion from the bus 57. Thus, in a single time interval the contents of any one register can be coupled through its output gate 56, the gating bus 57, and an input gate 58 to another register by applying appropriate, simultaneous, program, timing signals $t_p$ to the desired gates. Such gate selection by these timing signals is directed by sequencing circuits (not shown) in response to program instruction coding as is well known in the art. Since single-rail logic is employed for the registers, a receiving register is selectively cleared prior to receiving new information.

In like manner, the output of any register can be coupled through the gating bus 57 to a logic operations circuit 59 wherein a variety of operations can be performed while the information is being coupled to the register 10′ directly, or to any other register by way of the gating bus 57. Typical logic operations which may be performed in the operations circuit 59 include AND, OR, EXCLUSIVE OR, masking, and shift or rotate. Alternatively, signals may be passed through circuit 59 without change, and in the illustrative operations considered here such will be assumed in order to focus on the error detecting aspects of the present invention. Of particular interest in connection with the present invention is the connection of first-ZERO-detecting logic 11 to receive outputs from the logic operations circuit 59 and apply the resulting outputs of the logic 11 to register 10′ by way of circuits 12 and 14. and to error detector 9 by way of circuits 12. The parity computer 17 is also coupled to gating bus 57 to receive signals in bit-parallel therefrom for determining odd-even parity on such signals simultaneously with the transfer of such signals from one place to another.

It will be apparent to those skilled in the art that in FIG. 6 the logic 11 can be simplified because it is working between two registers and its transitory output signals are, therefore, not simultaneously altering its input register state. Thus, for example, the gates 36 and 37 in FIG. 3 are advantageously eliminated for FIG. 6 use so that the outputs of bistable circuits 32 go directly to their respective gates 33 and the outputs of gates 38 go directly to inputs of gates 33 of higher order. As modified, the logic 11 operates in FIG. 6 to receive inputs and produce outputs of the same types hereinbefore considered in connection with FIGS. 3 and 5.

One operation that can be performed in the data processing system of FIG. 6, and which is closely related to the counting embodiment of the invention hereinbefore described, is the normal processing operation of incrementing the contents of a register in a data processing system. This is accomplished in FIG. 6 by instruction coding which applies an ADD signal to first ZERO detecting logic 11 and to error detector 9, as well as applying selective timing signals to an output gate 56 of a register from which information is to be drawn and to the logic operations circuit 59. At this time the contents of register 10″, for example, are nondestructively coupled through the output gate 56 for that register to gating bus 57 in bit-parallel fashion. This information is simultaneously coupled through the input gate 58 to register 10′, through parity computer 17 to error detector 9, and through logic operations circuit 59 to first-ZERO-detecting logic 11. In detector 9 timing $t_p$ must be applied to bistable circuits 22 and 23 to register parity of incoming information. No change is made in the information in the logic operations circuit 59 although there are data processing functions in which one would desire to perform one of the previously enumerated logic operations on the data as it is coupled through circuit 59 to the first-ZERO-detecting logic 11.

The logic 11 responds in the manner described previously to establish enabling input signals on inputs to only one of the gates 33, and that one gate is activated by the ADD input signal. The activation of that one gate produces a transitory ground output signal on one of the leads 12 to alter the contents of register 10' for reflecting, as previously described, the incremented state of the information previously coupled thereto from register 10''. The transitory ground prevails for as long as the information signals are present on bus 57. The transitory ground signal in the leads 12 is also coupled to error detector 9 where it is utilized in the manner hereinbefore described to predict what parity condition should prevail in the incremented information in register 10'.

During a succeeding time interval register 10'' is cleared and the output gate circuit 56 of register 10' and the input gate 58 of register 10'' are activated to couple the contents of the register 10' to the register 10'' by way of gating bus 57. During this same interval parity computer 17 operates to determine the new parity condition of the information being transferred by way of bus 57 and registers the new parity condition in error detector 9 in the manner hereinbefore described. Thus, the accuracy of each incrementing operation is determined on a real time basis while the operation is taking place without the necessity for providing dual data processing equipment. Although two registers 10' and 10'' were used in the illustrative operation just described, a single register 10' can also be used in the same manner indicated for FIG. 1.

It was hereinbefore mentioned that another common data processing function which can be usefully performed in conjunction with the error detecting operations of the present invention is the find low ZERO test. In the latter operation the low order ZERO is located and marked to the ONE condition without altering the condition of any other bits in a data word. It is in this aspect of altering a single bit that the find low ZERO test differs from the counting type of operation in which one or more bits may be simultaneously altered. In the find low ZERO test the instruction coding causes an FLZT signal to be applied to first-ZERO-detecting logic 11 and to error detector 9. Now the contents of register 10'' are coupled through gating bus 57 to the first-ZERO-detecting-logic 11 as previously outlined in connection with the incrementing operation of FIG. 6. The contents of register 10'' are not coupled directly to register 10' this time. As in the previous case, the logic 11 produces a single ground output signal.

During the find low ZERO test the FLZT signal applied to logic 11 selects the alternate set of input gates to error detector 9. Only one stage of register 10' is affected by the output of logic 11 under the influence of the FLZT signal. This is the stage containing the low order ZERO, and that ZERO is now marked to the ONE condition. All other stages of register 10' remain in their cleared, or reset state. At the same time the single ground signal in leads 12 is coupled to error detector 9 wherein it disables one of the NAND gates 51 or 52 in FIG. 4 for operating the error detecting circuits of the type shown in FIG. 4 to predict what the new parity condition for the modified word should be for the condition wherein a single bit of the word under consideration is changed. Error detector 9 also has registered therein at this time the parity condition of the word initially withdrawn from register 10'' so that a proper parity prediction may be made and registered. During a subsequent time interval the modified contents of register 10' which now contain a single ONE in the bit position of the low order ZERO in the original information, are returned to register 10'' to overwrite that ZERO to a ONE without changing the rest of the word in register 10''. The new parity is computed and registered as previously described. Error detector 9 then compares the two parity indications to determine whether or not the find low ZERO test and mark the low ZERO to ONE have been performed accurately.

The error detection arrangements hereinbefore described demonstrate that error detection is readily realizable by circuit arrangements of the type outlined herein to facilitate real time error detection during frequently employed data processing operations such as counting and locating and marking a low order ZERO. Basic first-ZERO-detecting logic circuits are utilized for both types of processing functions, and in the course of such use those logic circuits perform in a way that is conducive to the convenient parity prediction based on first-ZERO-detecting logic signals so that the predicted parity can be compared with new parity to determine the accuracy of operation. In this regard the transitory first-ZERO-detecting logic signals are those which prevail in the logic output circuits for all or part of a processor time interval and which inherently contain information that is indicative of what new parity condition should prevail in the data being processed.

Although the present invention has been described in connection with particular embodiments thereof, it is to be understood that other embodiments and modifications which will be obvious to those skilled in the art are nevertheless included within the spirit and scope of the invention.

I claim:

1. In combination:

a multistage register containing data having a predetermined information-dependent characteristic, said stages having predetermined different orders of data significance and each having at least two data information-representative states of operation;

logic circuits coupled to said register stages, said logic circuits including means for interconnecting such circuits to one another so that the logic circuit coupled to the lowest order stage which is in a predetermined data state inhibits actuation of all higher order logic circuits;

means, including said logic circuits, for performing a predetermined operation on said data;

means simultaneously operable with said performing means for indicating whether or not said characteristic is to be changed by said operation;

means coupled to said register for determining a post-operation indication of said characteristic; and means comparing outputs of said indicating means and said determining means for evaluating the accuracy of said operation.

2. The combination in accordance with claim 1 in which said performing means comprises an additional register, and means transferring to said additional register the contents of the first-mentioned register.

3. The combination in accordance with claim 2 in which said performing means further comprises means coupling outputs of said logic circuits to said additional register, and means actuating said lowest order logic circuit to alter the information value of said data.

4. The combination in accordance with claim 3 in which said coupling means includes means coupling said lowest order logic to alter a part of said data transferred from the stage of said first-mentioned register coupled to said lowest order logic and from all lower order stages thereof.

5. The combination in accordance with claim 3 in which said actuating means comprises means coupling outputs of said additional register to inputs of the first-mentioned register.

6. The combination in accordance with claim 1 in which said performing means comprises an additional register, means resetting said additional register, means coupling outputs of said logic circuits to said additional register for setting one stage thereof, and means coupling outputs of said additional register to inputs of the first-mentioned register for setting a stage thereof corresponding to said one stage.

7. The combination in accordance with claim 1 in which said performing means comprises means actuating said lowest order logic circuit to alter the information value of said data.

8. The combination in accordance with claim 7 in which said performing means comprises means coupling an output of each of said logic circuits to inputs of its coupled register stage and of all lower order register stages.

9. The combination in accordance with claim 7 in which said performing means comprises an output gate in each of said logic circuits for operation in response to said actuating means, and means coupling an output of each logic circuit output gate to an input connection of the output gate of each lower order logic circuit.

10. The combination in accordance with claim 7 in which said indicating means comprises a multistable circuit, means setting said multistable circuit to a first or a second condition of stable operation to represent a first or a second condition of said data information characteristic, and means altering the state of said multistable circuit in response to predetermined outputs of said logic circuits.

11. The combination in accordance with claim 10 in which said multistable circuit is bistable, and said altering means complements said bistable circuit in response to actuation of an odd numbered one of said logic circuits in said order.

12. The combination in accordance with claim 10 in which said altering means comprises means operative in response to actuation of any of said logic circuits in said order for changing the state of said multistable circuit.

13. The combination in accordance with claim 7 in which said change indicating means comprises:

means responsive to an output of said lowest order logic circuit for producing signals indicating whether an odd or an even number of said stages contain data to be altered by said operation; and means comparing said signals from said producing means and a preoperation output of said determining means to indicate whether or not said characteristic is to be changed by said operation.